April 24, 1956  H. W. NEWSON  2,743,226
APPARATUS FOR THE BOMBARDMENT OF SAMPLES WITH FAST NEUTRONS
Filed Aug. 16, 1949

Inventor
Henry W. Newson

By Orland A. Anderson
Attorney

2,743,226
Patented Apr. 24, 1956

United States Patent Office

2,743,226

APPARATUS FOR THE BOMBARDMENT OF SAMPLES WITH FAST NEUTRONS

Henry W. Newson, Durham, N. C., assignor to the United States of America as represented by the United States Atomic Energy Commission Application August 16, 1949, Serial No. 110,538

4 Claims. (Cl. 204—193)

This invention relates generally to the bombardment of materials with neutrons, and is more particularly concerned with methods and means for the provision of a region characterized by the presence of a high flux of fast neutrons for irradiation purposes.

As used in this specification and in the appended claims, the following terminology is defined as indicated below:

Thermal Neutrons (slow neutrons).—Neutrons having a substantially Maxwellian number-energy distribution characteristic about an energy value equal to $kT$, where $k$ is a constant and $T$ is the temperature in degrees Kelvin. ($kT$=0.025 electron volt at 15° C.)

Fast Neutrons—Neutrons having an average kinetic energy greater than 100,000 electron volts.

Intermediate Neutrons—Neutrons having an average kinetic energy in the range between that of fast neutrons and that of thermal neutrons.

Fission—The splitting of an atomic nucleus, upon the absorption of a neutron, into a plurality of fragments of greater mass than that of an alpha particle, the splitting being accompanied by the release of energy and a plurality of neutrons.

Fissionable—Having the ability to undergo fission upon the absorption of a slow neutron.

Slow Neutron Absorber—An atomic nucleus having a slow neutron absorption cross section greater than one hundred barns.

Slowing Down Power of a Material—The average loss in the logarithm of its energy which a neutron experiences by reason of elastic collisions in traveling one cm. within the material in question.

An important current activity in the field of nuclear physics is the irradiation of various materials in a neutron flux. By means of such irradiation many useful purposes are served, among which are: the determination of cross sections for neutron induced nuclear reactions, the production of valuable radioisotopes, and the acquisition of knowledge as to the changes in physical characteristics of a material when subjected to neutronic bombardment.

As is well known, there are now in existence several neutronic reactors, or chain reacting piles, as they are sometimes called, which, by reason of their ability to produce neutrons at a greater rate than they are being dissipated by absorption and leakage, constitute a means for the establishment of extremely high neutron fluxes. Examples of these neutronic reactors may be found in Atomic Energy for Military Purposes, H. D. Smyth, Princeton University Press, Princeton, 1945, and in many other publications. Such neutronic reactors offer an ideal environment for carrying out the above-mentioned neutron bombardment activities, and they are, in fact, used extensively for that purpose. Channels for the insertion of samples to be bombarded may readily be left vacant at convenient positions during the construction of such reactors.

As far as is known, however, all presently existing neutronic reactors, with but one exception, are of the "thermal" type, that is, they rely for sustenance of their chain reaction primarily on "thermal" neutrons. In such thermal reactors, the great majority of the neutrons have energies in the range of only a few hundredths to a few tenths of an electron volt. And this is true despite the fact that the neutrons are originally produced by fission at high energies of the order of several million electron volts; due to the large proportion of moderator material present in thermal reactors, the initially fast neutrons are very quickly slowed down by elastic collision to thermal energies.

For the above reasons, it has heretofore been possible by means of a thermal reactor to effect bombardment of materials only with neutrons of an extremely low average energy level. This has represented a serious limitation to neutron bombardment activities since it is often desirable to irradiate a sample with neutrons having a high average energy level. Moreover, for some purposes it is further necessary that the irradiating flux of fast neutrons be of high purity, that is, substantially uncontaminated with slow and intermediate neutrons. This latter requirement is present, for example, in cases where it is desired to measure a particular effect on a material of bombardment with fast neutrons and where, as often happens, the material in question is far more sensitive to slow neutrons insofar as that particular effect is concerned. In such circumstances, unless the irradiating flux is substantially completely free of slow neutrons, the effect of the slow neutrons will completely overshadow that of the fast neutrons, and the effect of the fast neutrons alone becomes impossible of determination.

Of course, it is possible to construct a "fast" neutronic reactor, that is, one which relies primarily upon fast neutrons for the maintenance of the chain reaction, and such a pile would provide a suitable fast neutron flux for irradiation purposes. However, such fast reactors are subject to many disadvantages, particularly when considered purely from the standpoint of a source of bombarding neutrons. For instance, fast reactors require a greater amount of, and more highly refined, fissionable material. They are much more difficult to control. Also, they are much smaller and present less volume for irradiation activities. Moreover, as far as applicant is aware, there is only one such fast reactor now in existence, whereas many slow reactors are in operation and available for neutron bombardment purposes.

Accordingly, it is applicant's general objective to provide a region having a high flux of fast neutrons for the bombardment of materials, more particularly, a fast neutron flux substantially uncontaminated by the presence of slower neutrons. A more specific object of applicant's invention is to provide an irradiation chamber adapted to be inserted within a neutronic reactor whereby there is realized within said chamber an intense neutron flux having a substantially higher average energy level than that which exists throughout the remainder of the reactor, e. g., a fast neutron flux in a thermal neutronic reactor.

Applicant has conceived that the above objects could be accomplished in an ordinary thermal pile, in part by a process of selection, or discrimination, as between the slower and the faster neutrons. Thus, in accordance with the principles of the present invention, there is established within a neutronic reactor a confined region substantially surrounded by a material which discourages the entry of slow neutrons into said region while permitting fast neutrons free access to said region, that is, a material which, in effect, constitutes a filter for slow neutrons but not for fast neutrons. In this manner, the average neutron energy within the confined region is increased over that of the reactor as a whole by a factor dependent upon the disparity between the transparency of the filter material to fast and slow neutrons. Applicant has further conceived that this effect may be aggravated, and that the actual intensity of the fast neutron flux which exists within the confined region may be greatly increased, by utilizing a filter material which contains a fissionable nucleus, such as $U^{235}$, which, upon the absorption of a slow neutron, gives rise to additional fast fission neutrons. In the simplest form of the invention, therefore, applicant utilizes a hollow cylindrical body or chamber the walls of which are fabricated of natural uranium, and the interior of which forms a confined space into which the sample to be irradiated may be placed.

Other objects and advantages of the present invention will become apparent from the following description, taken in connection with the accompanying drawings, wherein.

In all of the above figures similar characters of reference are used to designate corresponding parts.

Figure 1:
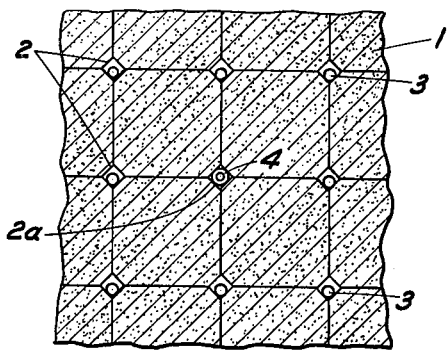
Fig. 1 is a sectional view showing a portion of one type of thermal neutronic reactor which would provide a suitable environment for the present invention, and illustrating the manner in which the irradiation chamber of the present invention may be disposed in such a reactor.

As is now well known, certain nuclei, including $U^{235}$, $Pu^{239}$, and $U^{233}$, have been found to undergo a process of fission upon the absorption of a neutron, the fission being accompanied by the simultaneous release of other neutrons. By aggregating a sufficient amount of such fissionable material at one place, it is possible to create the condition that, on the average, the number of new neutrons released within the system by fission is equal to, or greater than, the number of neutrons lost by absorption in the system and leakage from the system. Such an aggregation of fissionable material is referred to as a neutronic reactor or pile, and it, of course, will sustain a chain reaction of nuclear fissions. If, in the construction of such a neutronic reactor, there is included no appreciable amount of moderator, then the high velocity fission neutrons are absorbed or lost to the system while still at a high velocity. Such a neutronic reactor is termed a "fast" reactor since the average neutron energy is high. An example of such a fast reactor may be found in U. S. application Ser. No. 621,843, filed in the name of A. H. Snell.

A thermal reactor, on the other hand, is one in which sufficient moderator is mixed in along with the fissionable material so that the majority of the neutrons are slowed down to thermal velocities prior to their loss to the system via absorption or leakage. By slowing the neutrons down in this manner, an advantage is gained in that a smaller total amount of fissionable material is required since thermal neutrons are more effective than fast neutrons in inducing fission in such material. Of course, it is possible to construct a neutronic reactor which occupies any desired position intermediate the thermal and the fast reactor as regards average neutron energy, by simply utilizing that proportion of moderator which would provide the average neutron energy desired.

A further advantage can be attained with respect to the total amount of fissionable material required for the construction of a thermal neutronic reactor, particularly when natural uranium is to be employed, by lumping the fissionable material at regularly spaced points within the moderator, thus forming a lattice arrangement comprising alternate regions of fissionable material and moderator. Such a reactor is commonly referred to as a "heterogeneous" reactor, as distinguished from a "homogeneous" reactor in which the atoms of fissionable material are intimately mixed with the atoms of moderating material. Examples of heterogeneous thermal reactors may be found in U. S. patent application Ser. No. 596,465 filed in the names of E. Fermi and L. Szilard, and in U. S. Patent No. 2,708,656 for "Neutronic Reactor" issued May 17, 1955, in the names of E. Fermi and L. Szilard. In U. S. patent application Ser. No. 628,322, filed in the names of E. Wigner, G. Young and L. Ohlinger, there is illustrated one type of homogeneous thermal reactor.

The principles of the present invention may be applied to any of the above type reactors to obtain a localized region where in the average energy of the neutrons is comparable to the average energy of the nuetrons at their birth by fission. Thus, although applicable to any type reactor, the present invention is most advantageously applied to a thermal reactor wherein the average neutron energy is low, its advantages becoming progressively less marked as applied to reactors having increasing average neutron energy levels. Solely for purposes of illustration, therefore, applicant has chosen to illustrate his invention as it might be employed in connection with a heterogeneous thermal pile of the type described in detail in previously mentioned U. S. patent application Ser. No. 596,465.

Referring now to Fig. 1, there is shown a representative portion of a typical heterogeneous thermal reactor. Reduced to its essentials, such a reactor comprises simply a mass of moderator material 1, which may, for example, be built up of graphite blocks, the graphite blocks being chamfered along parallel edges so as to form a plurality of spaced fuel and coolant channels 2 into which fuel elements 3 of natural uranium, for example, may be charged, and through which a suitable coolant, such as water, air or helium, may be circulated. Although the present invention is not concerned with the manner of control, shielding, and other details of the reactor, reference is made to the aforesaid U. S. patent application Ser. No. 596,465 and U. S. Patent No. 2,708,656 for a complete description of such features.

Figure 2:
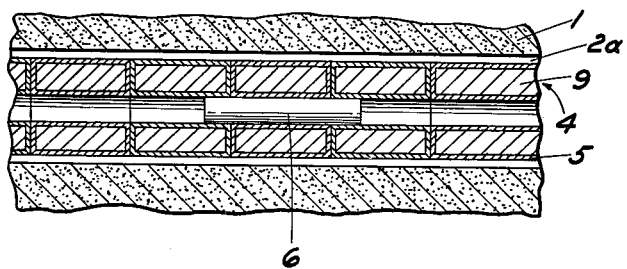
Fig. 2 is an enlarged sectional view taken at right angles to Fig. 1 and showing the irradiation chamber of the present invention in position in a fuel channel of the reactor.

Referring now also to Fig. 2, reference numeral 4 designates generally a radiation chamber constructed according to the principles of the present invention. As shown, chamber 4 may be inserted into one of the fuel channels, as indicated at 2a, or it may be inserted into a special channel formed especially for irradiation purposes. In the form of the invention illustrated in Fig. 2, the irradiation chamber 4 comprises a hollow cylinder, open at both ends, and formed of a material 9 the required properties of which will be more fully discussed hereinafter. The confined space within chamber 4 forms the neutron irradiation region into which is inserted a sample 6 of the material which is to be bombarded with fast neutrons. Sample 6, for instance, might be a graphite rod, the purpose of the experiment being, for example, to determine the physical deterioration of graphite when subject to a flux of uniformly fast neutrons. If desired, the exposed surface of material 9 may be completely canned or covered with a thin protective sheath or coating 5 in order to avoid direct contact between the cooling fluid and the material 9. Whether such a coating is necessary will depend primarily upon the cooling fluid used and the type of coolant system employed, whether a oncethrough system or a recirculating system. In general, coating 5 will be required only when the pile design is such as to require a coating for the normal fuel elements. The coating should be formed of a material, such as aluminum, having a low absorption cross section, say less than one barn, for slow as well as fast neutrons.

As shown, as many of the cylindrical chambers 4 may be disposed in end-to-end relationship in channel 2a as are required to accommodate the length of sample 6. When the irradiation chamber 4 is open at its ends, as in Figs. 2 and 3, the overall length of the bombardment region is preferably large as compared to the length of sample 6 so that when the sample is centered within the bombardment region, it is substantially completely shielded from the slow neutron flux of the reactor proper.

The material 9 from which the chamber 4 is formed should have the following characteristics: (1) It should be a fissionable material; (2) it should have a higher absorption cross section for slow neutrons than it has for fast neutrons; and (3) it should have a low neutron slowing down power, preferably below about $0.02$ cm.$^{-1}$. Natural uranium exhibits all of these characteristics and is suitable for this purpose. It, of course, is a fissionable material, its average slow neutron cross section for fission being about four barns; its slow neutron absorption cross section is about thirty-five times that of its fast neutron absorption cross section; and its slowing down power is equal to about $0.004$ cm.$^{-1}$. Chamber 4 would be even more effective for its purpose if it were formed of $U^{235}$, $U^{233}$, or $Pu^{239}$, or of a material containing substantial amounts of these fissionable nuclei. The slow neutron absorption cross section for fission is over five hundred barns for each of these three fissionable nuclei. Uranium enriched in the $U^{235}$ isotope would be very satisfactory as material 9. Of course, the higher the proportion of fissionable nuclei contained in material 9, the more intense will be the bombarding flux of fast neutrons within the chamber.

In operation, neutrons from the reactor proper, which are predominately slow neutrons, pass through the substantially transparent coating 5 into material 9. Because of the preferential absorption of material 9 for slow as compared to fast neutrons, the percentage of slow neutrons which pass unabsorbed through material 9 into the irradiation region is very much smaller than the corresponding percentage of fast neutrons. This effect, then, tends to raise the average energy of the neutron flux within the irradiation region. A more important effect, however, arises from the fact that a large fraction of the slow neutrons which are absorbed in material 9 induce fission, thereby releasing additional fast neutrons. The arithmetic value of this fraction, of course, depends upon the proportion of fissionable atoms contained in material 9. These additional fast neutrons may then proceed on into the irradiation region with little chance of being absorbed or slowed down in the remaining thickness of material 9.

The overall effect, therefore, of material 9, reduced to its simplest terms, is that this material prevents the entry of slow pile neutrons into the irradiation region while permitting the entry of fast pile neutrons, and at the same time, effectively converts many of the slow neutrons which have been stopped into an additional number of fast neutrons which are also permitted free access to the irradiation region.

Figure 3:
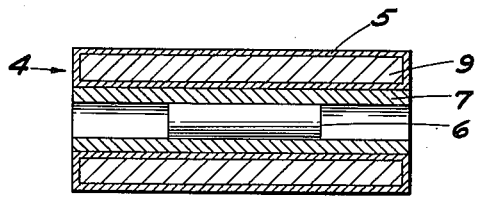
Fig. 3 is a sectional view illustrating a modified form of the invention.

In Fig. 3 there is shown a modified form of irradiation chamber 4, the modification comprising the provision of a ring or insert 7 positioned adjacent to and interiorly of the cylinder of material 9, said insert containing a substantial proportion of a suitable slow neutron absorber. It may be desirable to use this form of the invention, for example, where the complete absence of slow neutrons in the irradiation region is a primary consideration. Boron or cadmium, or materials containing a substantial proportion of one of these, would be suitable materials for the construction of ring 7. The slow neutron absorption cross section of boron is about seven hundred barns and its absorption cross section varies inversely with the square root of the neutron energy. Cadmium has a slow neutron absorption cross section of about three thousand barns, its absorption cross section rising to over seven thousand barns at a resonance energy level around $0.18$ electron volt, and then dropping off sharply at higher energies.

Figure 4:
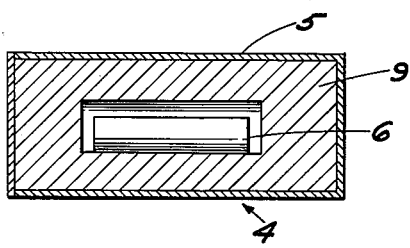
Fig. 4 is a sectional view showing still another modification of the invention.

In Fig. 4, the chamber 4 is formed as a cylinder of material 9 which is closed at both ends. The irradiation region containing the sample 6, being thus completely surrounded on all sides by material 9, is obviously more effectively shielded from the slow neutrons from the pile proper. In this modification, also, a boron or cadmium containing insert, similar to 7 of Fig. 3, may be formed as a cylinder closed at both ends and disposed intermediate the sample 6 and material 9.

Since many changes could be made in the above construction, and many apparently widely different embodiments of this invention could be made without departing from the scope thereof, it is intended that all matter contained in the above description, or shown in the accompanying drawings, shall be interpreted as illustrative and not in a limiting sense. In particular, it should be understood that although the irradiation chamber of the present invention has been illustrated in connection with a heterogeneous thermal reactor, and its manner of operation particularly described on that basis, the invention may be employed with equal advantage in connection with any type of thermal pile, and with somewhat less advantage perhaps in connection with intermediate and fast piles.

I claim:

1. Apparatus for irradiating a sample with fast neutrons comprising, in combination with a neutronic reactor, an irradiation chamber disposed within the interior of said reactor, the walls of said irradiation chamber forming a substantially confined region adapted to accommodate the sample to be bombarded, said walls being constructed of uranium enriched in the 235 isotope.

2. Neutron irradiation apparatus adapted to be disposed within a neutronic reactor, comprising a substantially closed container the interior of which is adapted to accommodate a sample of material to be irradiated, the outer portion of the walls of said container containing fissionable nuclei and the inner portion of the walls of said container containing a non-fissionable slow neutron absorber.

3. Apparatus for irradiating a sample with fast neutrons comprising, in combination with a neutronic reactor, an irradiation chamber removably disposed within the interior of said reactor, the walls of said irradiation chamber forming a completely enclosed region adapted to accommodate the sample to be bombarded, said walls being constructed of uranium enriched in the 235 isotope.

4. Neutron irradiation apparatus adapted to be removably disposed within a neutronic reactor, comprising a completely closed container, the interior of which is adapted to accommodate a sample of material to be irradiated, the outer portion of the walls of said container being constructed of uranium enriched in the 235 isotope, and the inner portion of the walls of said container being constructed of boron.

References Cited in the file of this patent

UNITED STATES PATENTS

| 2,206,634 | Fermi et al. | July 2, 1940 |

FOREIGN PATENTS

| 861,390 | France | Oct. 28, 1940 |
| 233,011 | Switzerland | Oct. 2, 1944 |

OTHER REFERENCES

Review of Modern Physics, vol. 12, No. 1 (Jan. 1940), an article by Louis A. Turner, pp. 8, 9, 11, 13.

Smyth, H. D.: "A General Account of the Development of Methods of Using Atomic Energy for Military Purposes" (August 1945), Superintendent of Documents, Washington, D. C., pp. 177–179, 39, 26.

Smyth: "Atomic Energy for Military Purposes," pp. 103–104 (August 1945).

MDDC–1424, "Water Boiler," U. S. A. E. C., 3 pages (October 27, 1947).

Kelly et al.: Physical Review 73, 1135–9 (1948).

Davis et al.: "Nucleon Bombarded Germanium Semiconductors, II," U. S. A. E. C. Doc. #AECD–2054, Oak Ridge Nat. Lab., Declass. June 3, 1948, 6 pages.

Science, vol. 105, No. 2,723, pp. 265–7 (March 7, 1949).